(12) United States Patent
Arnott et al.

(10) Patent No.: US 7,582,216 B2
(45) Date of Patent: Sep. 1, 2009

(54) WATER TREATMENT AND BYPASS SYSTEM

(75) Inventors: Justin Arnott, Calgary (CA); Brian Lee, Toronto (CA)

(73) Assignee: Imbrium Systems Corp., Rockville, MD (US)

( * ) Notice: Subject to any disclaimer, the term of this patent is extended or adjusted under 35 U.S.C. 154(b) by 0 days.

(21) Appl. No.: 11/843,377

(22) Filed: Aug. 22, 2007

(65) Prior Publication Data

US 2009/0050583 A1 Feb. 26, 2009

(51) Int. Cl.
*B01D 21/02* (2006.01)
(52) U.S. Cl. ............ 210/747; 210/801; 210/170.03; 210/254; 210/521; 210/532.1
(58) Field of Classification Search .......... 210/747, 210/800, 801, 803, 170.03, 254, 521, 532.1, 210/538
See application file for complete search history.

(56) References Cited

U.S. PATENT DOCUMENTS

| | | | |
|---|---|---|---|
| 2,708,520 A * | 5/1955 | Dallas | 210/526 |
| 3,374,894 A | 3/1968 | Webster | |
| 3,779,385 A | 12/1973 | Strohecker | |
| 3,862,040 A * | 1/1975 | Preus et al. | 210/254 |
| 4,225,434 A | 9/1980 | Ernst et al. | |
| 4,363,731 A | 12/1982 | Filippi | |
| 4,578,188 A | 3/1986 | Cousino | |
| 4,693,821 A | 9/1987 | Goronszy et al. | |
| 4,985,148 A | 1/1991 | Monteith | |
| 5,100,545 A * | 3/1992 | Brooks | 210/532.1 |
| 5,266,191 A * | 11/1993 | Greene et al. | 210/521 |
| 5,405,539 A | 4/1995 | Schneider | |
| 5,433,845 A * | 7/1995 | Greene et al. | 210/170.03 |
| 5,490,922 A | 2/1996 | Gresa | |

(Continued)

FOREIGN PATENT DOCUMENTS

FR 2 694 748 2/1994

(Continued)

OTHER PUBLICATIONS

PCT Notification of Transmittal of the International Search Report and The Written Opinion of the International Searching Authority, or the Declaration for PCT/US 08/73805 mailed Nov. 7, 2008, 8 pages.

*Primary Examiner*—Christopher Upton
(74) *Attorney, Agent, or Firm*—Hunton & Williams

(57) ABSTRACT

A water treatment system having a system inlet to receive a fluid flow, a treatment chamber, a first system outlet, and a second system outlet. The treatment chamber has an inlet in communication with the system inlet and an outlet in communication with the first system outlet, and is adapted to remove one or more contaminants from the fluid flow. The second system outlet is separated from the system inlet by a weir that prevents the fluid from passing into the second system outlet when the fluid is below a predetermined height, and allow at least a portion of the fluid to pass into the second system outlet without passing through the treatment chamber when the fluid is above a predetermined height. The second system outlet is isolated from the first system outlet such that fluid passing through the first system outlet can not impinge upon the treatment chamber outlet.

23 Claims, 7 Drawing Sheets

U.S. PATENT DOCUMENTS

| | | | |
|---|---|---|---|
| 5,498,331 A * | 3/1996 | Monteith | 210/170.03 |
| 5,531,888 A | 7/1996 | Geiger et al. | |
| 5,560,826 A | 10/1996 | Szereday et al. | |
| 5,725,760 A | 3/1998 | Monteith | |
| 5,746,911 A * | 5/1998 | Pank | 210/170.03 |
| 5,746,912 A | 5/1998 | Monteith | |
| 5,753,115 A | 5/1998 | Monteith | |
| 5,759,415 A | 6/1998 | Adams | |
| 5,814,216 A | 9/1998 | Filion | |
| 5,849,181 A | 12/1998 | Monteith | |
| 5,860,767 A | 1/1999 | Atkins | |
| 5,902,477 A | 5/1999 | Vena | |
| 6,015,496 A | 1/2000 | Khudenko | |
| 6,068,765 A | 5/2000 | Monteith | |
| 6,077,448 A * | 6/2000 | Tran-Quoc-Nam et al. | 210/532.1 |
| 6,099,743 A * | 8/2000 | Pedersen | 210/801 |
| 6,106,706 A | 8/2000 | Roy et al. | |
| 6,132,626 A | 10/2000 | Hart | |
| 6,371,690 B1 | 4/2002 | Monteith | |
| 6,547,962 B2 * | 4/2003 | Kistner et al. | 210/170.03 |
| 6,783,683 B2 * | 8/2004 | Collings | 210/170.03 |
| 6,869,528 B2 | 3/2005 | Pank | |
| 6,991,734 B1 * | 1/2006 | Smith et al. | 210/747 |
| 7,022,243 B2 * | 4/2006 | Bryant | 210/747 |
| 7,094,337 B2 | 8/2006 | Williams et al. | |
| 7,238,281 B2 | 7/2007 | Su et al. | |
| 7,314,549 B2 * | 1/2008 | Swift | 210/170.03 |
| 2002/0139736 A1 * | 10/2002 | Stever et al. | 210/170 |
| 2004/0074846 A1 | 4/2004 | Stever et al. | |
| 2005/0103698 A1 * | 5/2005 | Eberly | 210/532.1 |

FOREIGN PATENT DOCUMENTS

| | | |
|---|---|---|
| GB | 604083 | 11/1945 |
| GB | 2 126 264 | 3/1984 |

* cited by examiner

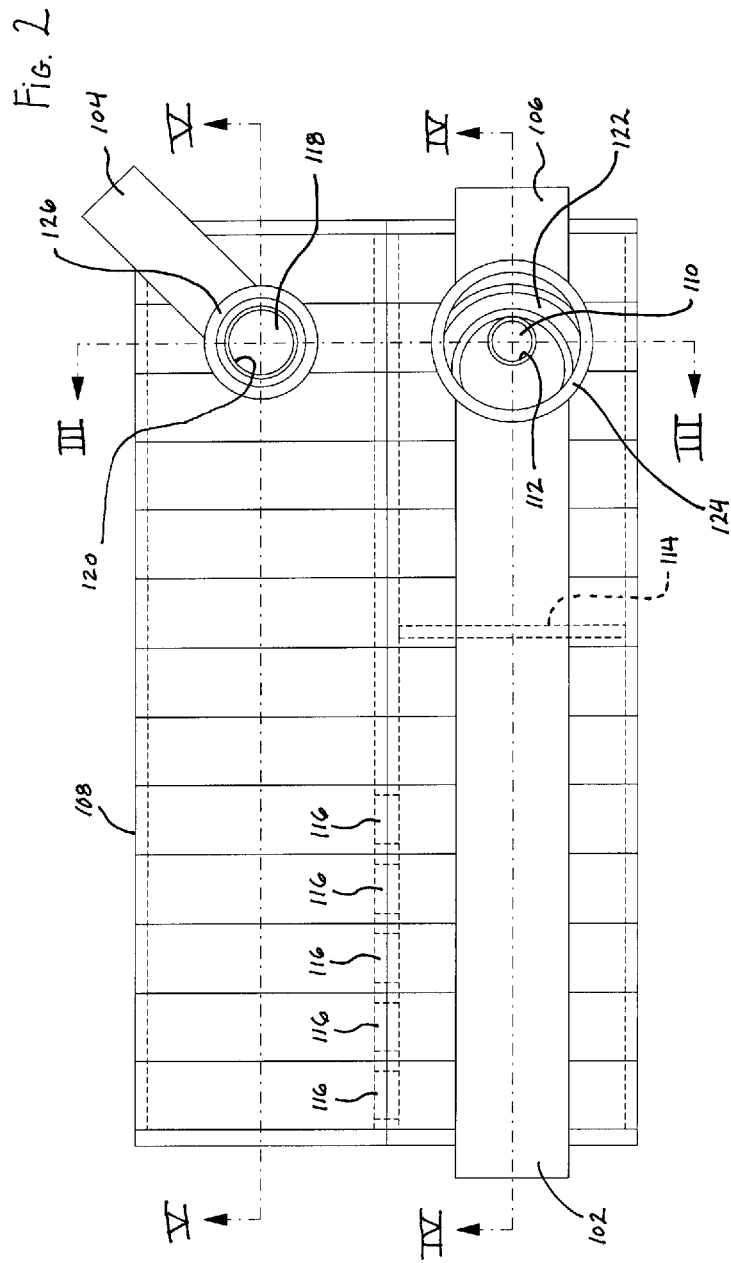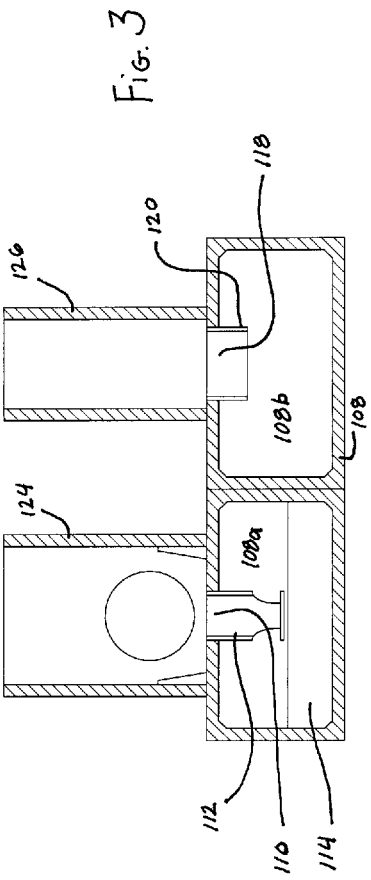

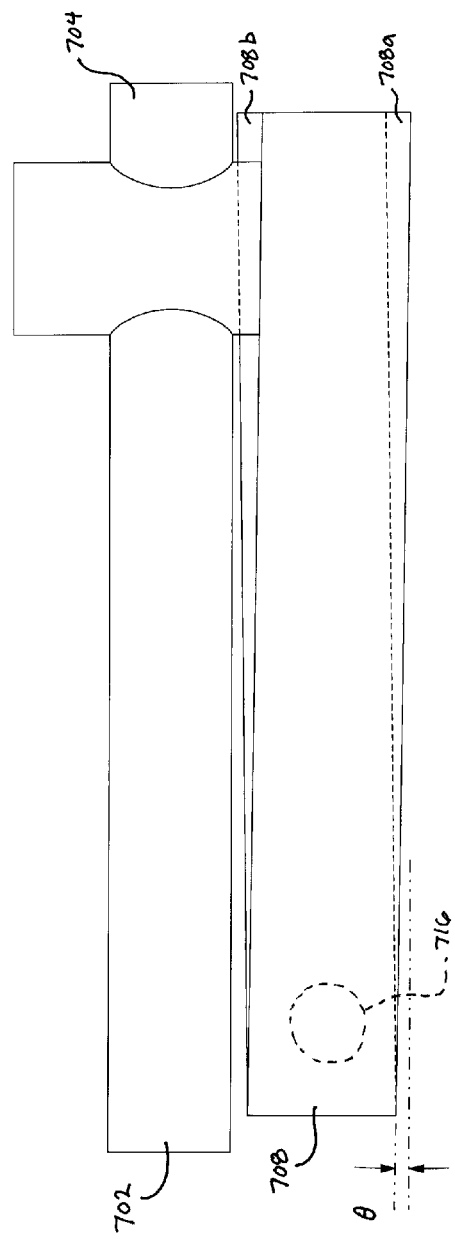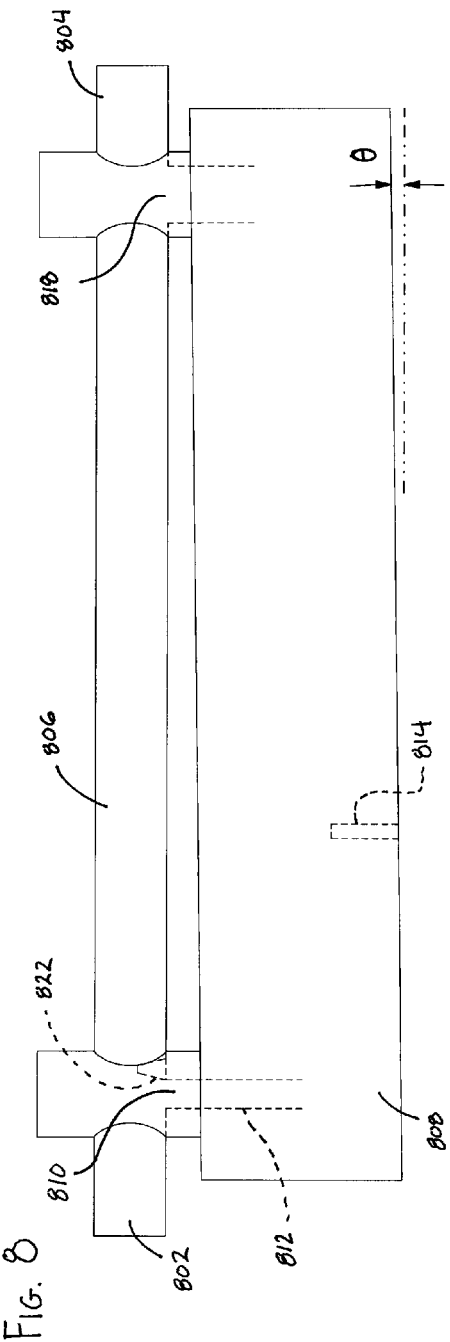

WATER TREATMENT AND BYPASS SYSTEM

FIELD OF THE INVENTION

The present invention relates to water treatment systems for handling and distributing runoff water during normal low flow conditions and during periodic high flow conditions that may occur due to storms or under other circumstances.

BACKGROUND OF THE INVENTION

Water treatment systems are in widespread use in a variety of applications, and have been provided and proposed in many diverse forms. One application for water handling systems is to collect and treat runoff water that may collect in parking lots, industrial centers, highways, and other places where paved surfaces or other man-made structures inhibit the water's ability to seep into the ground or find its way to natural watercourses. Such runoff water typically is attributable to rainfall, but might come from other natural or man-made sources. It may be suitable, under some circumstances, to simply provide culverts or sewers to collect the runoff water and direct it to a natural watercourse. In many other instances, however, the water will collect and carry debris, sediment, chemicals, or other pollutants that are present along their path, which makes it desirable to treat the water to remove such pollutants before allowing the water to proceed to a natural watercourse. In such cases, a water treatment system may be employed.

One type of conventional water treatment system is a separator tank, which are sometimes called interceptors. These devices typically comprise a container that receives runoff water and forces it to pass under, over or around multiple obstructions that help segregate the water from pollutants. For example, floatable solids and other lighter-than-water pollutants, such as oil and grease, can be separated, to some degree, by forcing the water to pass under an object that skims these substances from the surface of the water. Similarly, sediment and other heavier-than-water substances can be removed by passing the water over obstacles. Of course, the flow rate of the water, turbulence within the separator tank, and many other factors contribute to the ability to separate such pollutants, and it is not necessary to explain such factors in detail here. Examples of known separator tanks are shown in U.S. Pat. Nos. 6,068,765; 6,371,690; 5,753,115; 4,985,148; and 5,498,331, which are all incorporated herein by reference.

One problem associated with all water treatment systems is that the flow rate of the incoming runoff water can fluctuate dramatically, particularly when there are storms or other high-flow events, such as when other runoff paths become obstructed. As a result, engineers specifying the dimensions and capabilities of water treatment systems must anticipate the expected fluctuations, and design the water treatment system accordingly. While it might be possible to simply increase the size of the treatment facility to accommodate any possible influx, doing so might simply be too expensive or the resulting structure might be too large for the given space. Furthermore, the water passing through such an oversized system under higher flow conditions is likely to entrain pollutants that were separated during low flow conditions and carry them downstream. This is sometimes called scouring.

To prevent scouring and provide a more economically sound solution, some treatment systems include a bypass that allows a portion of the storm water to pass through them without being treated. Some of these bypasses, such as those described in the aforementioned patents, are designed to prevent the high flow of storm water from scouring the contents of the treatment tank and carrying the previously-collected pollutants downstream. In these devices, low flows or water are blocked by a weir, which forces the water down through a drop pipe and into a treatment chamber. There, pollutants settle or precipitate out of the water, and then the water ascends out of the tank through a riser pipe to continue downstream. Under high flow conditions, the incoming water exceeds the height of the weir—either because the volume of the water is simply higher than the weir height, or because backpressure in the treatment path causes the water level upstream of the weir to rise above the weir height. Under these conditions, the portion of the water above the weir flows over the weir and to the device's outlet. As it does so, it passes over the drop pipe and also the riser pipe, which can potentially allow some collected contaminants to pass downstream with the storm water.

While the foregoing water treatment systems and other systems have been employed to effectively remove pollutants and prevent scouring, a need still exists for alternative and improved water treatment systems.

SUMMARY OF THE INVENTION

In a first exemplary aspect, there is provided a water treatment system having a system inlet adapted to receive a fluid flow, a first system outlet, a treatment chamber, and a second system outlet. The treatment chamber has a treatment chamber inlet in fluid communication with the system inlet and a treatment chamber outlet in fluid communication with the first system outlet. The treatment chamber provides a fluid passage from the treatment chamber inlet to the treatment chamber outlet and is adapted to remove one or more contaminants from the fluid flow. The second system outlet is separated from the system inlet by a weir. The weir is adapted to prevent the fluid flow from passing into the second system outlet when the fluid flow is below a predetermined height, and allow at least a portion of the fluid flow to pass into the second system outlet without passing through the treatment chamber when the fluid flow is above a predetermined height. The second system outlet is isolated from the first system outlet such that fluid passing through the second system outlet can not impinge upon the treatment chamber outlet.

In another exemplary aspect, there is provided a water treatment system having a system inlet adapted to receive a fluid flow, a system outlet, and a treatment chamber. The treatment chamber has a treatment chamber inlet in fluid communication with the system inlet and a treatment chamber outlet in fluid communication with the system outlet. The treatment chamber provides a fluid passage from the treatment chamber inlet to the treatment chamber outlet and is adapted to remove one or more contaminants from the fluid flow. A bypass passageway joins the system inlet to the system outlet, and a weir positioned in the bypass passageway. The weir is adapted to prevent the fluid flow from passing to the system outlet when the fluid flow is below a predetermined height, and allow at least a portion of the fluid flow to pass to the system outlet without passing through the treatment chamber when the fluid flow is above a predetermined height. The treatment chamber is provided with a reverse slope extending upwardly from the treatment chamber inlet to the treatment chamber outlet.

In another exemplary aspect, there is provided a method for treating water. The method includes collecting water into a system and causing at least a first portion of the water to descend through an inlet opening into a treatment chamber during relatively low flow conditions and during relatively high flow conditions. The first portion of the water enters the treatment chamber generally above a low point of a lower surface of the treatment chamber. The first portion of the water is then conveyed in an ascending manner along the lower surface of the treatment chamber to cause heavier-than-water contaminants to settle generally below the inlet opening. The method also includes causing the first portion of the water to ascend through an outlet opening and expelling the first portion of the water from the system. The method further includes allowing at least a second portion of the water to bypass the treatment chamber during relatively high flow conditions, and expelling the second portion of the water from the system.

The recitation of this summary of the invention is not intended to limit the claimed invention. Other aspects, embodiments, modifications to and features of the claimed invention will be apparent to persons of ordinary skill in view of the disclosures herein. Furthermore, this recitation of the summary of the invention, and the other disclosures provided herein, are not intended to diminish the scope of the claims in this or any prior or subsequent related or unrelated application.

BRIEF DESCRIPTION OF THE DRAWINGS

Various embodiments of the present invention are described in detail with reference to the examples shown in the following figures in which like parts are designated by like reference numerals.

FIG. 2 is top plan view of the embodiment of FIG. 1.

FIG. 3 is a cross-section view of the embodiment of FIG. 1, as shown along line III-III of FIG. 2.

FIG. 7 is a side elevation view of an alternative embodiment of the invention.

FIG. 8 is a side elevation view of a further alternative embodiment of the invention.

DETAILED DESCRIPTION OF EMBODIMENTS OF THE INVENTIONS

Figure 1:
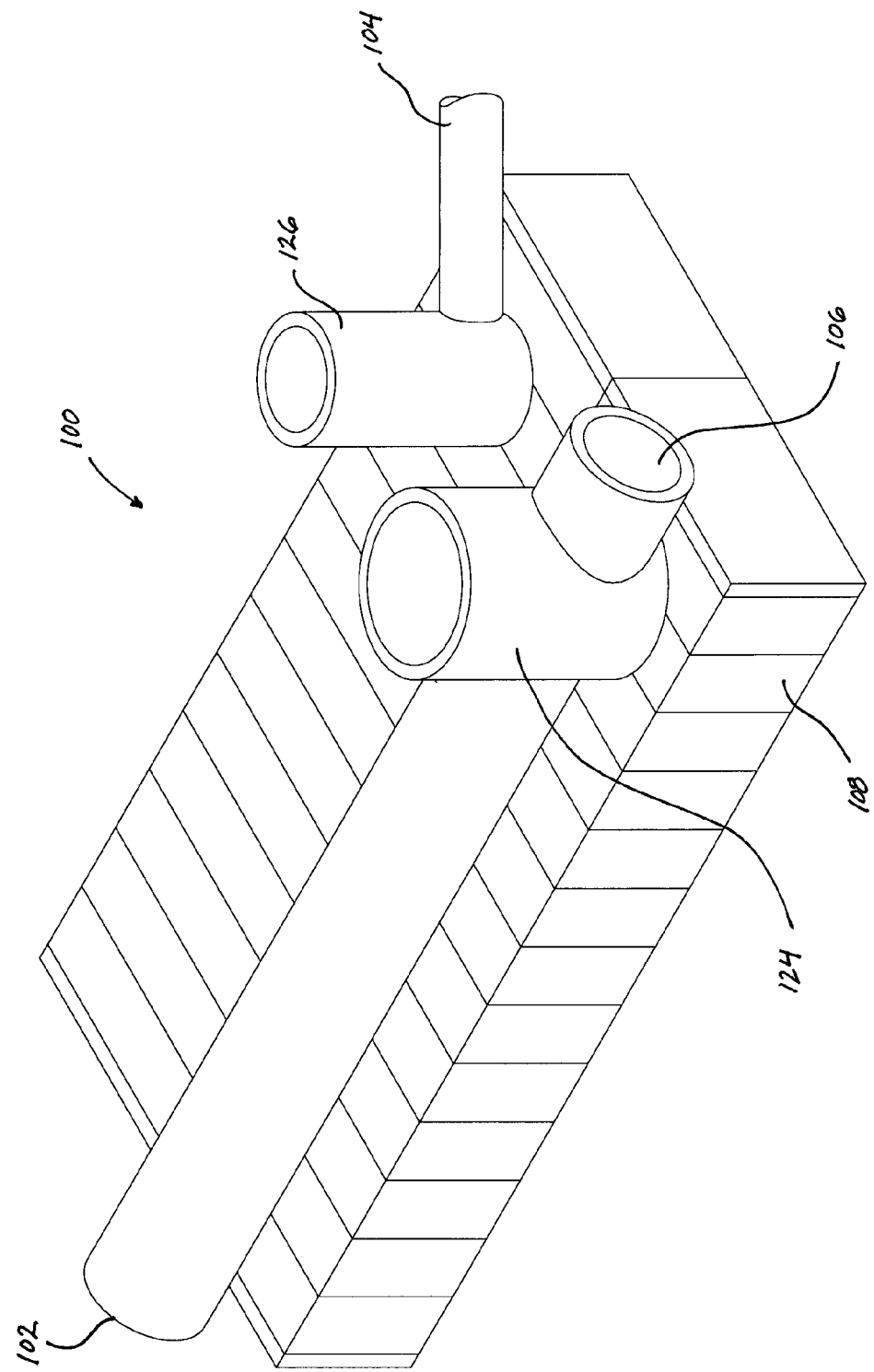
FIG. 1 is a front isometric view of an exemplary embodiment of a water treatment system of the present invention.

An exemplary embodiment of the present invention is shown in FIGS. 1-5. As shown in FIG. 1, this embodiment provides a large-scale water pre-treatment and bypass system 100 generally having an inlet 102, a treatment outlet 104, and a bypass outlet 106, and a treatment chamber 108. The inlet 102 and outlets 104, 106 may comprise any standard fluid conduit material, such as concrete piping. Similarly, the treatment chamber 108 may comprise any generally water-tight material that is suitable for above- or below-ground placement, with concrete being one example of such a material. The details of the exemplary embodiment are shown in detail in FIGS. 2-5.

Figures 4, 5:
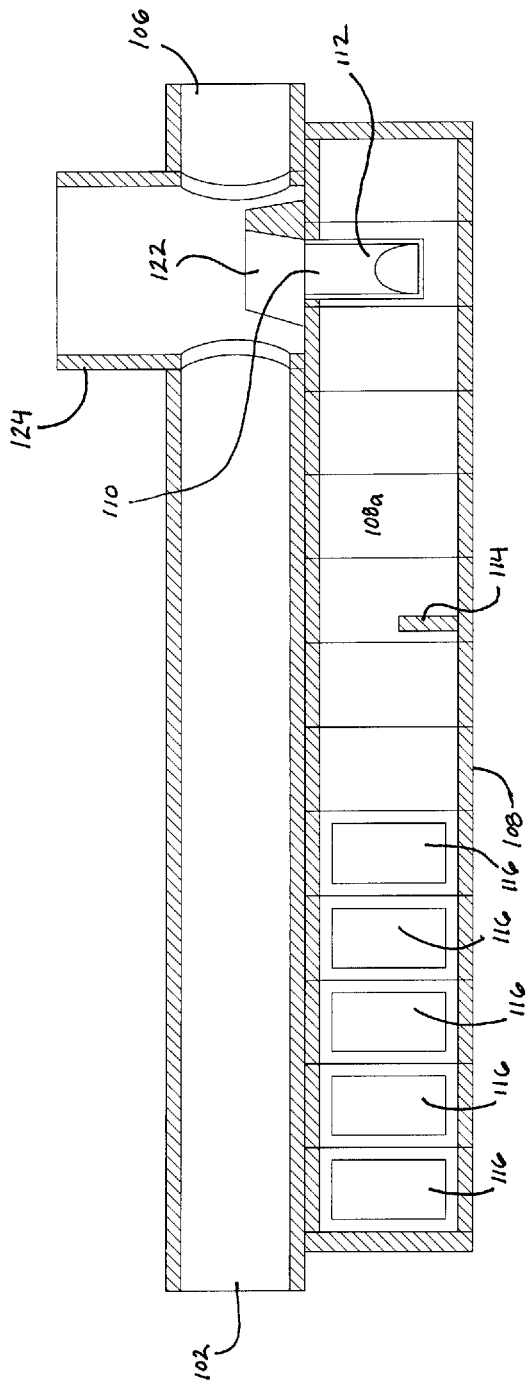
FIG. 4 is a cross-section view of the embodiment of FIG. 1, as shown along line IV-IV of FIG. 2.
FIG. 5 a cross-section view of the embodiment of FIG. 1, as shown along line V-V of FIG. 2.

Referring now to FIG. 4, the inlet 102 supplies water to the treatment chamber 108 by way of an inlet opening 110 through the upper wall of the treatment chamber 108. The opening 110 may include a drop pipe 112, which extends vertically down into the treatment chamber 108. Such a drop pipe might be useful to help introduce the incoming fluid quiescently into the treatment chamber 108, and the shape and height of the drop pipe 112 can be adjusted to help initiate the treatment process. For example, the illustrated drop pipe 112 extends about halfway down into the treatment chamber 108, and terminates at a generally T-shaped outlet that directs the incoming water in opposite directions. The use of such a T-shaped outlet might improve separation by dispersing the water and causing it to travel across the entire cross-sectional area of the treatment chamber 108. Doing so may increase the amount of time the fluid remains in the treatment chamber 108, providing more time for sediment, floatables and other contaminants to precipitate or settle out of the water. Details of such drop pipes are provided in U.S. Pat. No. 6,068,765, which is incorporated herein by reference. Of course, in other embodiments, other inlet drop pipes may be used. For example, the drop pipe 112 may comprise a simple pipe that terminates at an opening at its bottom end, or at a J-shaped outlet. As another alternative, the device can be operated without a drop pipe.

The treatment chamber 108 comprises one or more compartments through which the water flows before being discharged out the treatment outlet 104. In the shown embodiment, the treatment chamber 108 comprises two compartments: an upstream compartment 108a, and a downstream compartment 108b. Of course, more or fewer compartments may be used, and they may be arranged in any combination of parallel or serial flows. Either compartment 108a, 108b may include any known treatment devices, such as walls or weirs to direct fluid flow, divide fluids of different densities, and help precipitate out heavier-than-water solids. The compartments also may include filters, screens, coalescers or any other suitable treatment devices.

Figure 10:
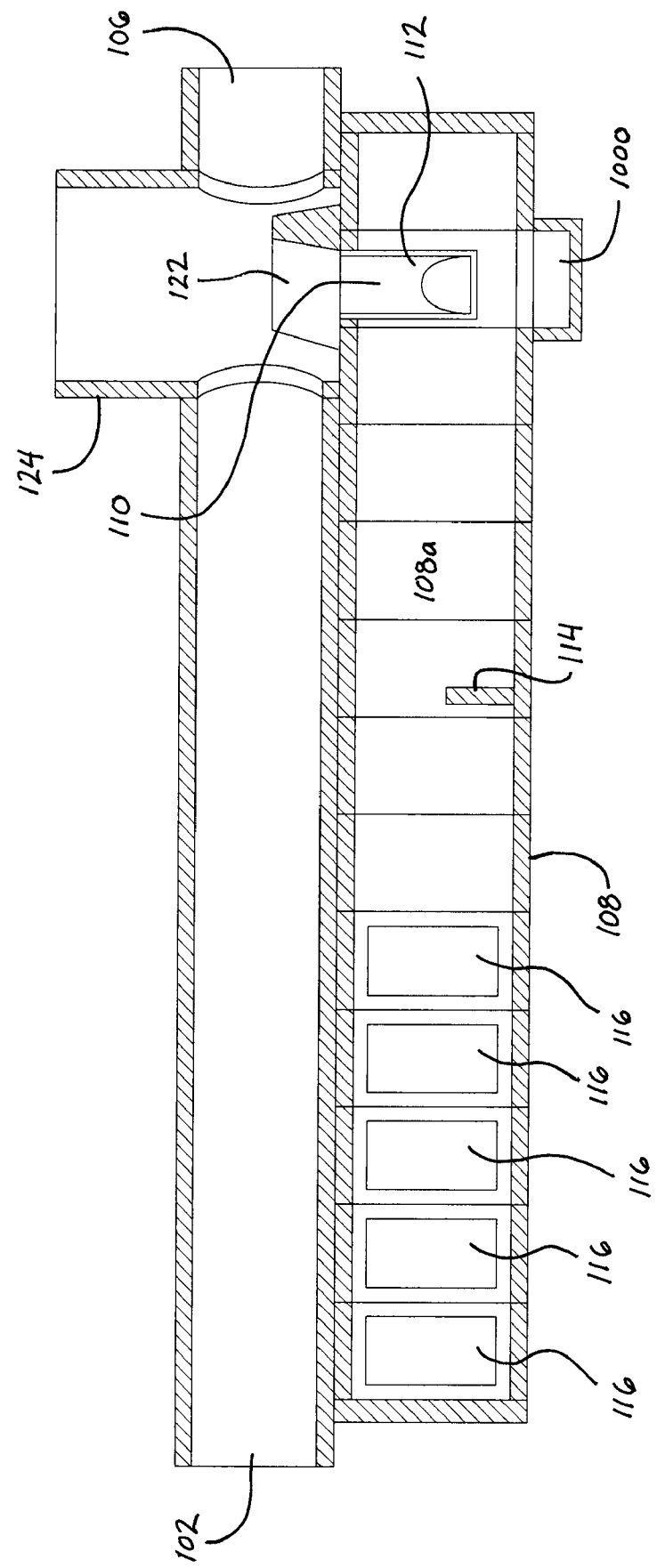
FIG. 10 is a cross-section view of the embodiment of FIG. 1, modified to have a pit located below the inlet drop pipe.

In the shown embodiment, the upstream compartment 108a includes a blocking wall 114 that extends vertically from the bottom wall of the compartment 108a. The lower wall helps contain larger or coarser debris that settles shortly after entering the treatment chamber 108 from passing further along the treatment chamber 108. The blocking wall 114 may have any suitable height, but in the shown embodiment it is slightly lower than the inlet drop pipe 112 to allow fluid to pass horizontally over the blocking wall 114. The blocking wall 114 may help treatment efficiency by containing larger heavier-than-water debris in a single area, but its primary purpose is to contain such debris in a relatively centralized area to simplify cleanout. In an alternative construction, the compartment 108a may include one or more lowered portions or pits that provide areas in which heavier-than-water debris can settle and collect in a single area. In such an embodiment, the pit or pits may be located to facilitate cleaning and/or encourage the most effective collection of debris. For example, as shown in FIG. 10, a pit 1000 may be located below the drop pipe 112 to collect and retain debris in a manner such as described above with respect to the function of the blocking wall 114. A combination of one or more pits and blocking walls may be used in other embodiments.

In the exemplary embodiment, the upstream compartment 108a communicates with the downstream compartment 108b by a number of openings 116 formed through the sidewalls of the two compartments. The openings 116 may include screens (not shown) or other filtering devices. The openings 116 also may be shaped to skim floatables or heavier-than-water fluids or objects from the central water flow. For example, the illustrated openings 116 are somewhat smaller than the overall height of the treatment chamber 108, which creates upper and lower lips that can help separate heavier and lighter objects and fluids from the water.

The downstream compartment 108b may, like the upstream compartment 108a, include various filtration devices or structures to assist with separating contaminants from the water. In the shown embodiment, however, the downstream compartment 108b is a simple rectangular passage that extends generally parallel to the upstream compartment 108a. The downstream compartment 108b terminates at an outlet opening 118 through the upper wall of the compartment 108b. The outlet opening 118 communicates with the treatment outlet 104. A riser pipe 120 may be provided to extend down into the downstream compartment 108b from the outlet opening 118. The riser pipe 120 is provided to prevent floating debris and lighter-than-water fluids from escaping upwards out of the outlet opening 118, and its length can be adjusted to optimize this function. An screen or other filtration device may optionally be provided over the outlet opening 118 or riser pipe 120, if a riser pipe 120 is used.

While the shown compartments 108a, 108b are illustrated as being adjacent rectangular passages that are generally coextensive with one another, it will be appreciated that these compartments may be provided in other configurations. For example, the compartments 108a, 108b may have a cross-sectional shape other than a rectangle, and square, cylindrical or ovate cross-sectional shapes can be used effectively in alternative embodiments. The compartments 108a, 108b also may be located remotely from one another, in which case the openings 116 may be connected by tubes or other passageways. The compartments 108a, 108b also may be formed as a single continuous compartment. As another example, the compartments 108a, 108b may be vertically stacked, arranged to form a vertical or horizontal s-shaped treatment chamber 108, or arranged in a descending staircase pattern. These and other configurations may be useful to provide a relatively large total treatment chamber 108 in a limited space or improve treatment performance.

Figure 6:
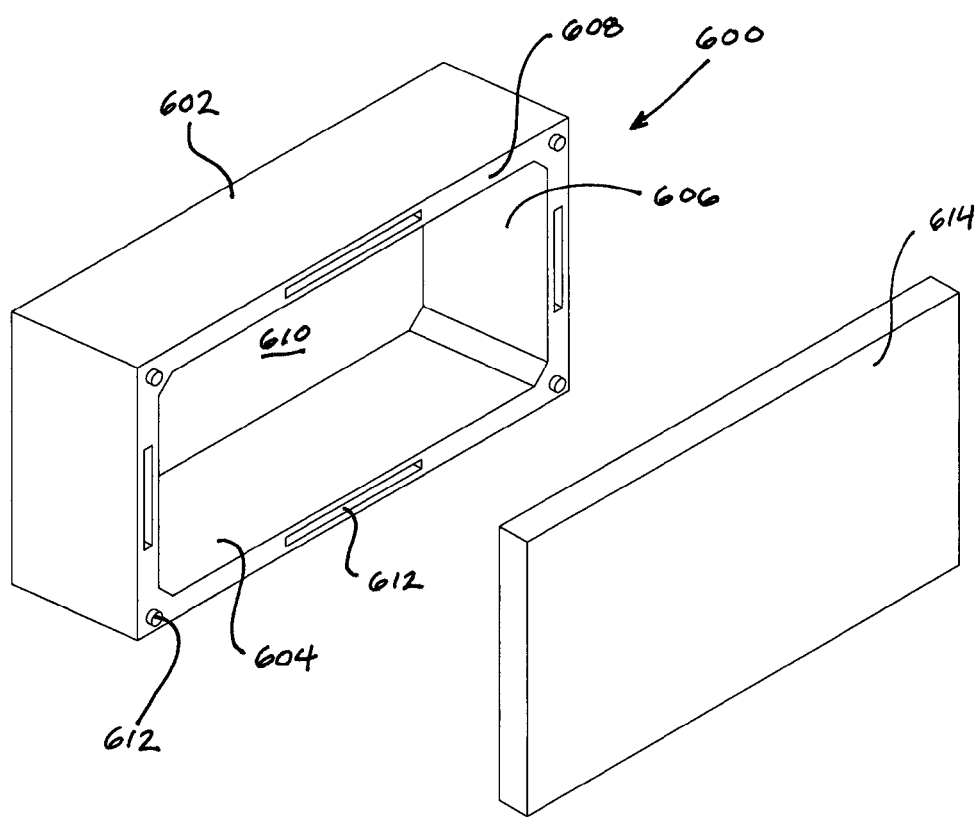
FIG. 6 is an isometric view of an exemplary block unit and end cap system of the present invention.

Turning now to FIG. 6, in the shown exemplary embodiment, the compartments 108a, 108b are formed from multiple concrete block units 600. Each block unit 600 comprises a generally rectangular open shape having a top wall 602, bottom wall 604, and side walls 606. The block unit 600 also has an end face 608 on each side forming a perimeter around its central opening 610. The block units 600 can be easily fabricated using a simple mold. Furthermore, individual block units 600 can be customized by cutting openings through them, such as the side openings 116 that connect the two compartments 108a, 108b in the shown embodiment, and the inlet opening 110 and outlet opening 118. Such openings can also be formed by including a removable blank in the concrete mold and casting the opening directly into the finished shape. In addition, the end faces 608 may include cast-in-place ridges, pins, holes and/or slots 612 that interlock with one another to help form a seal between the block units 600 when they are placed end-to-end to form a compartment. End caps 612 comprising a simple wall are provided to attach to the end faces 608 seal the ends of each compartment 108a, 108b. The end caps 612 may also include ridges, pins, holes, slots and the like to mate with those on the block units 600, if they are desired. The use of the foregoing block units 600, or similar devices, allows an engineer to easily resize the device for a particular application without having to modify or change any tooling.

It will be appreciated that the foregoing construction can be modified in many ways. For example, as previously noted, other cross-sectional shapes for the block units 600 may be used in other embodiments. The block units 600 may have ovate or circular cross-sections instead of the shown rectangular cross-section. Furthermore, the block units 600 may be sized to allow them to be produced off-site and transported to the construction site, or they may be created at the construction site itself. In another alternative embodiment, the treatment chamber 108 may be formed by other methods, such as by being cast in place as a single large construct. Casting in place may be useful where it provides an economic or performance benefit, such as where the device is so large that it is inconvenient or uneconomical to form block units 600 separately and transport them to the construction site.

As will be clear from the Figures, water leaving the downstream compartment 108b flows up through the outlet opening 118 and proceeds downstream along the treatment outlet 104. The treatment outlet 104 may lead to one or more downstream treatment facilities, such as an ultraviolet light treatment plant, a chemical treatment plant, a filtration facility, or a combination of the forgoing. Alternatively, where the device is the last element in a series of treatment devices or where it is intended to be the only device in the treatment system, the treatment outlet 104 may lead to a natural watercourse. To encourage proper flow to the treatment outlet 104, the outlet opening 118 and/or treatment outlet 104 may positioned at a slightly lower elevation than the inlet opening 110 and inlet 102. A person of ordinary skill in the art will be able to determine a suitable height differential based on conventional hydraulic principles.

As previously noted, the water system 100 also includes a bypass outlet 106. The bypass outlet 106 is provided to allow at least a portion of the incoming water to bypass the treatment compartment 108 and treatment outlet 104 during high flow conditions. In the shown embodiment, a weir 122 is provided just past the inlet opening 110 into the treatment chamber 108. The weir 122 is positioned to prevent water entering through the inlet 102 from passing into the bypass outlet 106 until it reaches a predetermined level. Until such time, the incoming water must pass down into the treatment chamber 108, and then to the treatment outlet 104. Once the water level exceeds a predetermined level, it begins to flow over the weir 122 and into the bypass outlet 106. The bypassing water can be directed either to a runoff area, such as a natural watercourse, or to a secondary treatment facility, such as a treatment plant that is adapted to handle relatively high water flows.

The level at which the incoming water begins to bypass the treatment chamber 108 and treatment outlet 104 can be adjusted by, for example, modifying the shape and size of the weir 122. A higher weir will, of course, increase the bypass point. The bypass point may be selected according to a number of considerations, such as the capability of the treatment chamber 108 or a downstream treatment facility to effectively treat the water without scouring removed contaminants. The weir 122 itself may have any suitable shape, such as the illustrated crescent-shaped, steeply-sloped wall, a straight vertical wall, a gently sloping incline, and so on.

In the shown embodiment, the bypassing water is isolated from the treatment chamber outlet opening 118. This can be accomplished by directing the bypass water out of the treatment stream entirely (e.g., directing it to a natural watercourse or runoff area), directing it to a separate treatment facility, or by configuring the bypass outlet 106 to rejoin the fluid stream leaving through the treatment outlet 104 at an elevation or location that makes it unlikely or impossible for the bypassing water to flow back up to the outlet opening 118. This configuration prevents the bypassing water from potentially mixing with water that has already been treated, or siphoning fluid through the treatment chamber 108 at a rate that can cause scouring. If the fluid passing through the bypass outlet 106 is arranged to rejoin the fluid passing through the treatment outlet 104, it may do so at the treatment outlet 104, between the treatment outlet 104 and an additional downstream treatment facility (not shown), or downstream of one or more additional downstream treatment facilities. Causing the bypass to rejoin downstream of additional treatment facilities allows the downstream treatment facilities to be sized to accommodate typical low flows and makes it unnecessary for the downstream treatment facilities to include a bypass for high flows.

Figure 9:
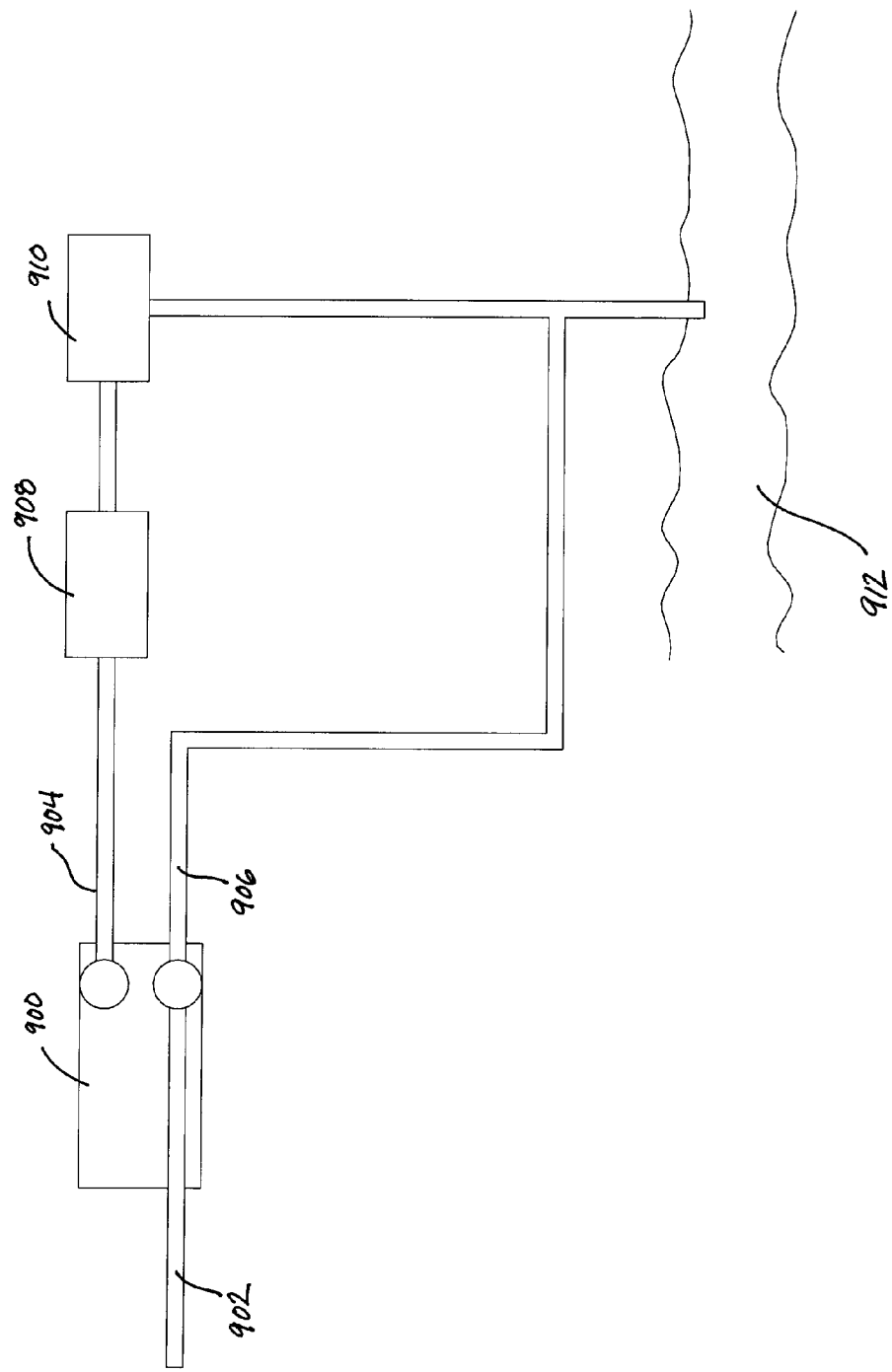
FIG. 9 is a schematic view of an embodiment of the invention as shown in relation to other exemplary fluid handling devices.

An example of a system as described above is illustrated schematically in FIG. 9, which shows a combined treatment and bypass device 900, such as the device 100 of FIG. 1 or a variation of that device, being positioned to receive water from a sewer pipe 902. The device 900 includes a treatment outlet 904 leading to downstream treatment facilities 908, 910, and a bypass outlet 906 that rejoins the fluid stream downstream of the second treatment facility 910. From here, the mixed stream passes to a natural watercourse 912. In other embodiments, the bypass outlet 906 may rejoin the treatment outlet 904 upstream of one or more of the treatment facilities 908, 910, or it may proceed directly to the watercourse 912, or it may proceed to a separate treatment facility (not shown).

An additional benefit of this configuration is that water will still continue to pass through the treatment chamber 108 and out of the treatment outlet 104 even during high flow conditions. Thus, the treatment process does not stop—and might even increase—when bypass occurs. In order to prevent scouring during such conditions, the treatment chamber 108 can be configured to prevent or inhibit flow rates that would cause scouring, even when the incoming water level is at or well above the bypass point. This can be accomplished by adjusting the height or configuration of the weir 122, changing the differential height across the treatment chamber 108, adjusting the size of the inlet opening 110 and/or outlet opening 118 or providing an orifice plate to restrict the water flow, or by other means that will be apparent to persons of ordinary skill in the art in view of the present disclosure.

It will be appreciated that the treatment chamber 108 may require periodic inspection or maintenance. It also may be necessary at times to inspect or clear the inlet 102, bypass outlet 104 or treatment outlet 106. Service access to the shown embodiment is provided at an inlet tower 124 and an outlet tower 126. The towers 124, 126 may comprise concrete cylinders or other structures that are suitable for placement underground. The towers 124, 126 may terminate at their upper ends at suitable covers or at a service building. One or more ladders (not shown) may be provided to allow workers to descend the towers 124, 126 to service the device. In addition, by using the side-by-side treatment compartments 108a, 108b as shown in the illustrated embodiment, the device can provide a relatively long treatment path through the treatment chamber 108, while still allowing the towers 124, 126 to be located near one another to simplify access to the device. It will be understood that additional towers may be placed between towers 124, 126 or at other locations to allow greater access to the device.

To facilitate cleaning the treatment chamber 108, the drop pipe 112 and/or riser pipe 120 may be removable to allow greater access to the treatment chamber 108. Additional manholes or other access points, such as vacuum hose openings, also may be provided, if desired. Also, one or more permanent vacuum points may be provided to allow remote cleaning. Such vacuum points would include a pre-mounted vacuum hose that extends into the treatment chamber 108 that can be accessed remotely by a vacuum or pump to remove the contents of the treatment chamber 108 without having to insert a separate vacuum hose.

As noted above, one or more blocking walls 114 may be provided in the compartment or compartments 108a, 108b to help collect debris in certain areas to assist with periodic cleanouts. In addition, in the shown embodiment, the compartments 108a, 108b are provided with a flat lower wall, which provides a relatively large surface for collecting silt and other heavy deposits as compared to a cylindrical chamber shape, which may also be used with the present invention, if desired. The flat lower wall also facilitates cleaning by industrial equipment such as small bull dozers or other equipment. Such equipment may be lowered into the compartments 108a, 108b through top openings, or they may drive in through a removable side or end wall. To allow such equipment to operate unobstructed, the blocking walls 114 or other internal baffle structures, if any are provided, may be temporarily removable or displaceable.

Referring now to FIG. 7, an alternative embodiment of a treatment system comprises an inlet 702, a treatment outlet (not shown), a bypass outlet 706, and a treatment chamber 708. This embodiment is generally identical to the embodiment of FIGS. 1-5, but differs in that the treatment chamber 708 comprises upstream and downstream compartments 708a, 708b that are inclined relative to the fluid flow direction. More specifically, the upstream compartment 708a, which receives the normal low-flow water through a drop pipe or other similar structure, is inclined at a slight angle $\Theta$ as it progresses in the downstream direction. This reverse slope arrangement causes sediment and other heavier-than-water debris to collect at the bottom of the sloped compartment 708a where it can be more easily cleaned from the treatment chamber 708. One or more blocking walls or pits (not shown) may also be provided to help contain debris at the lower end of the compartment 708a. The fluid passes from the upstream compartment 708a to the downstream compartment 708b by one or more passages or openings 716. The downstream compartment 708b also may be reverse sloped such that sediment and other debris settles at its lower end. While the shown embodiment provides both compartments 708a, 708b with a reverse slope, this is not strictly necessary in all embodiments, and it may be sufficient for only one compartment to have a reverse slope. In addition, it will be appreciated that the reverse slope arrangement described herein positions a low point of the treatment chamber generally below the inlet into the treatment chamber, but it is not necessary for this to be the lowest point the entire treatment chamber. Rather, it can simply be a regional low point from which the lower wall of the treatment chamber generally ascends as the fluid is conveyed toward the treatment chamber outlet. While this regional low point may be the lowest point in the entire treatment chamber, in other embodiments, additional lower points may be provided further along the treatment chamber after the initial ascent up the reverse slope.

Referring to FIG. 8, another alternative embodiment of a treatment system comprises an inlet 802 and a combined treatment and bypass outlet 804. A treatment compartment 808 communicates with the inlet 802 by an inlet opening 810 and with the combined outlet 804 by an outlet opening 818. The treatment chamber 808 may include a drop pipe 812 and/or riser pipe 820 to direct or control the fluid flow, as described previously herein. A weir 822 is provided to direct the incoming fluid into the treatment chamber under low flow conditions, and allow a portion of the fluid to bypass the treatment chamber 808 under high flow conditions. A bypass pipe 806 joins the inlet 802 with the outlet 804, and provides a flow path for bypassing water to pass to the outlet 804. As with the embodiment of FIG. 7, all or a portion of the treatment chamber 808 is inclined with a reverse slope Θ from the inlet opening 810 to the outlet opening 818 to encourage sediment and other heavier-than-water debris to settle below the inlet opening 810 where it can be easily removed during periodic cleaning operations. A blocking wall 814 may also be provided to help encourage such settling.

In both of the preceding embodiments a portion or all of the treatment chamber's lower wall is provided with a reverse slope—that is, a slope that rises in the direction of fluid flow. In either of these embodiments or other embodiments using a reverse slope, the reverse slope can be formed by appropriately modifying the cross-section of the treatment chamber or by simply inclining all or a portion of the treatment chamber. Furthermore, it is not strictly necessary for the reverse slope to extend across the entire length of the treatment chamber, although this may be desirable in some circumstances. The angle of the reverse slope is shown as being about 0.5 to about 3 degrees, but lesser or greater slopes may be used, depending on the circumstances.

It is believed that the present invention can be used in various configurations and applications to provide an effective combined water bypass and treatment system. For example, the invention may be used as a pre-treatment facility for receiving water from highway runoffs and removing sediment, dirt, metals, chemicals, floatables (such as oil, grease, and floatable solids), or other contaminants from the water prior to being treated in an ultraviolet treatment plant. The bypass of such a system could be directed to a natural watercourse or other treatment facilities. Furthermore, when embodiments of the invention are constructed using block units having the shown rectangular shape or other repeating shapes (such as cylinders), the invention provides a highly-scalable system that can be quickly and easily adjusted to accommodate various treatment requirements, such as dwell time requirements (i.e., the amount of time in the treatment chamber to allow pollutants to settle or precipitate out), and capacity requirements (i.e., the total contaminant holding volume).

The present disclosure describes a number of new, useful and nonobvious features and/or combinations of features that may be used separately or together. The embodiments described herein are all exemplary, and are not intended to limit the scope of the inventions in any way. It will be appreciated that the inventions described herein can be modified and adapted in various ways and for different uses, and all such modifications and adaptations are included in the scope of this disclosure and the appended claims.

We claimed:

1. A water treatment system comprising:
    a system inlet adapted to receive a fluid flow;
    a first system outlet;
    a treatment chamber having a treatment chamber inlet in fluid communication with the system inlet and a treatment chamber outlet in fluid communication with the first system outlet, the treatment chamber providing a fluid passage from the treatment chamber inlet to the treatment chamber outlet and being adapted to remove one or more contaminants from the fluid flow;
    a second system outlet separated from the system inlet by a weir, the weir being adapted to prevent the fluid flow from passing into the second system outlet when the fluid flow is below a predetermined height, and allow at least a portion of the fluid flow to pass, untreated, into the second system outlet without passing through the treatment chamber when the fluid flow is above a predetermined height;
    wherein the second system outlet is isolated from the first system outlet such that fluid passing through the second system outlet in such a manner as to flow back up into the treatment chamber outlet has been inserted can not impinge upon the treatment chamber outlet.

2. The water treatment system of claim 1, wherein the second system outlet is adapted to convey fluid passing therethrough to join fluid passing through the first system outlet downstream of the treatment chamber outlet at a location at which fluid passing through the second system outlet can not flow back up into the treatment chamber outlet.

3. The water treatment system of claim 1, wherein the first system outlet is adapted to convey fluid passing therethrough to at least one downstream treatment facility.

4. The water treatment system of claim 3, wherein the second system outlet is adapted to convey fluid passing therethrough to join fluid passing through the first system outlet downstream of the treatment chamber outlet and at a location at which fluid passing through the second system outlet can not flow back up into the treatment chamber outlet.

5. The water treatment system of claim 3, wherein the second system outlet is adapted to convey fluid passing therethrough to join fluid passing through the first system outlet downstream of the at least one downstream treatment facility and at a location at which fluid passing through the second system outlet can not flow back up into the treatment chamber outlet.

6. The water treatment system of claim 1, wherein the treatment chamber inlet comprises a drop pipe extending downwardly into the treatment chamber.

7. The water treatment system of claim 1, wherein the treatment chamber outlet comprises a riser pipe extending downwardly into the treatment chamber.

8. The water treatment system of claim 1, wherein the treatment chamber comprises:
    an upstream compartment having an upstream end and a downstream end, the treatment chamber inlet being positioned proximate the upstream end of the upstream compartment;
    a downstream compartment having an upstream end and a downstream end, the treatment chamber outlet being positioned proximate the downstream end of the downstream compartment; and
    a passage joining the downstream end of the upstream compartment with the upstream end of the downstream compartment.

9. The water treatment system of claim 8, wherein the upstream compartment and the downstream compartment are arranged in a generally parallel relationship with the upstream end of the upstream compartment being located adjacent the downstream end of the downstream compartment.

10. The water treatment system of claim 9, further comprising one or more access towers positioned to service the treatment chamber inlet and the treatment chamber outlet.

11. The water treatment system of claim 8, wherein the upstream compartment is inclined at a reverse slope adapted to cause heavier-than-water contaminants to collect proximate the treatment chamber inlet.

12. The water treatment system of claim 8, wherein the downstream compartment is inclined at a reverse slope adapted to cause heavier-than-water contaminants to collect proximate the passage.

13. The water treatment system of claim 8, wherein the treatment chamber further comprises one or more of a blocking wall and a pit adapted to contain heavier-than-water contaminants proximate the treatment chamber inlet.

14. The water treatment system of claim 1, wherein the treatment chamber further comprises one or more of a blocking wall and a pit adapted to contain heavier-than-water contaminants proximate the treatment chamber inlet.

15. The water treatment system of claim 1, wherein the treatment chamber comprises a reverse slope adapted to cause heavier-than-water contaminants to collect proximate the treatment chamber inlet.

16. The water treatment system of claim 15, wherein the reverse slope comprises a lower surface of the treatment chamber having a slope angle of about 0.5 degrees to about 3 degrees.

17. The water treatment system of claim 15, wherein the entire treatment chamber is inclined upwards towards the outlet opening to thereby form the reverse slope.

18. A method for treating water comprising:
collecting water into a system;
causing at least a first portion of the water to descend through an inlet opening into a treatment chamber during relatively low flow conditions and during relatively high flow conditions, wherein the first portion of the water enters the treatment chamber generally above a regional low point of a lower surface of the treatment chamber;
conveying the first portion of the water in an ascending manner along an inclined portion of the lower surface of the treatment chamber to cause heavier-than-water contaminants to settle generally below the inlet opening;
causing the first portion of the water to ascend through an outlet opening;
expelling the first portion of the water from the system;
allowing at least a second portion of the water to bypass the treatment chamber during relatively high flow conditions;
and expelling the second portion of the water from the system through a separate outlet opening in such a manner as to flow back up into the treatment chamber outlet has been inserted.

19. The method of treating water of claim 18, wherein the method further comprises passing the first portion of the water over a blocking wall to thereby contain heavier-than-water contaminants proximate the treatment chamber inlet.

20. The method of treating water of claim 18, wherein conveying the first portion of the water in an ascending manner along the lower surface of the treatment chamber comprises conveying the first portion of the water upwards out of a pit located below the inlet opening.

21. The method of treating water of claim 18, wherein conveying the first portion of the water in an ascending manner along the lower surface of the treatment chamber comprises conveying the first portion of the water upwards along a reverse slope formed by a lower surface of the treatment chamber.

22. The method of treating water of claim 21, wherein the reverse slope comprises an angle of about 0.5 degrees to about 3 degrees.

23. The method of treating water of claim 18, wherein the regional low point is the lowest point in the treatment chamber.

* * * * *

UNITED STATES PATENT AND TRADEMARK OFFICE
CERTIFICATE OF CORRECTION

| | | |
|---|---|---|
| PATENT NO. | : 7,582,216 B2 | Page 1 of 1 |
| APPLICATION NO. | : 11/843377 | |
| DATED | : September 1, 2009 | |
| INVENTOR(S) | : Justin Arnott and Brian Lee | |

It is certified that error appears in the above-identified patent and that said Letters Patent is hereby corrected as shown below:

Column 10, claim 1, line 7, (line 22 of claim 1), please delete "has been inserted"

Column 12, claim 18, line 10, (line 23 of claim 18), please delete "has been inserted"

Signed and Sealed this
Sixteenth Day of October, 2012

David J. Kappos
*Director of the United States Patent and Trademark Office*